United State
Peter

[11] 3,908,444
[45] Sept. 30, 1975

[54] APPARATUS AND METHOD OF CLEARANCE AND VIBRATION MEASUREMENT IN ROTARY MACHINES

[76] Inventor: Udo Peter, c/o Kraftwerk, 8023 Hollriegelskreuth, Germany

[22] Filed: Aug. 20, 1973

[21] Appl. No.: 389,470

[30] Foreign Application Priority Data
Aug. 23, 1972 Germany.............................. 2241436

[52] U.S. Cl.................................. 73/71.3; 250/224
[51] Int. Cl. ............................................. G01h 9/00
[58] Field of Search...................... 73/67, 71.1, 71.3; 356/167; 250/224

[56] References Cited
UNITED STATES PATENTS

| | | | |
|---|---|---|---|
| 2,441,343 | 5/1948 | Becker................................ | 356/167 |
| 2,540,105 | 2/1951 | Dunbar et al........................ | 73/71.3 |
| 3,604,940 | 9/1971 | Matthews............................ | 356/167 |

OTHER PUBLICATIONS
Isom, Abstract of Ser. No. 51,892, filed Sept. 30, 1948, Published in O.G.664 p. 959, on Nov. 18, 1952, 250–224.

Primary Examiner—Jerry W. Myracle
Assistant Examiner—John P. Beauchamp
Attorney, Agent, or Firm—William R. Woodward

[57] ABSTRACT

One or more tangential bores communicating with the clearance between a rotor or a shaft and the adjacent machine casing are provided, so that light beams may be projected through the clearance to measure the clearance and to detect variations therein, as measured by the amount of light that passes through the clearance. Observation of the clearance at two or more positions distributed about the circumference of the rotor makes it possible to determine the behavior of the rotor and its shaft. Axial clearance is similarly determined for observation of axial displacement or vibration. Observation of radial clearance may also be made with axially distributed measurements. Pressure seals and mirrors for the light channels are shown. For small clearances, the use of a laser as a light source is desirable.

13 Claims, 9 Drawing Figures

APPARATUS AND METHOD OF CLEARANCE AND VIBRATION MEASUREMENT IN ROTARY MACHINES

This invention relates to apparatus and methods observing and measuring vibration and distortion occurring during operation of a rotary machine and in particular the vibrations, displacements and distortions which are observable as small variations in the clearance space between a rotor or a shaft and a fixed structure. The gap width can be directly measured and, with the help of measurements at two or more positions of the machine, relative and absolute vibrations and displacements, both radial and axial displacement of a shaft or rotor of the machine and distortions of the housing or other fixed structures and likewise of the rotor may be determined. The apparatus and method of the invention is particularly applicable to steam turbines, gas turbines, compressors, blowers, pumps and a wide variety of experimental devices in active operation, under test. The invention also can yield useful information when the machine is at rest.

Rotating machines of the types just mentioned have parts rotating rapidly at clearances which are held small because of the pressures that must be utilized or produced. The nature and extent of distortions, displacements and vibrations of even very low amplitudes are accordingly important to observe.

The measurement of the gap width inside the pressure casing of a turbine, compressor, pump or the like makes it possible to obtain reliable evaluation of the margin of safety at any particular time during operation. The principle of measurement according to the present invention makes it possible to distinguish the amplitude of vibration of the shaft or rotor, as well as the relative position of shaft and mounting and also distortions of the rotor or of the fixed structure. Such measurements may be used as a running check on the operation of the machine to provide warning of critical operating conditions in starting and stopping or during normal running, and thus prevent risk of damage by radial or axial chafing.

The measurement of bearing vibration is known to be feasible, in view of the ready accessibility of the place of measurement. Such measurements have been carried out successfully for some time. In this case the so called vibratory intensity (effective value of the velocity of vibration) is measured by a search coil system with seismic attachments. For more complete determinations regarding a complex vibratory system, it has been found necessary in recent years to resort to direct determination of the shaft vibration. This was first done with measuring devices installed at the accessible portion of the shaft sensing the vibrations by mechanical contact. Later such devices were superseded by contactless measurement using signal transmitters sensing changes in the air gap induction between the signal transmitter and the shaft surface.

The measurement of bearing and shaft vibrations in the limited regions that are readily accessible has made possible only approximative extrapolations of the actual conditions existing inside the machine casing. A mathematically expressed theoretical concept of the generally complex vibratory systems involving several coupled rotors and multiple bearings is hardly possible on the basis of measurements taken exclusively in the region of the bearings. The provision of built-in transmitters within the machine casings for the purpose of measuring shaft vibrations has so far failed on account of the limited temperature stability of the signal transmitters and on account of construction difficulties.

It is an object of the present invention to provide practical and economical methods and apparatus for measuring clearances, i.e. gap widths, inside the housings of rotary machines, particularly in cases where the gaps are subject to pressure and temperature stresses. By a suitable choice of the places of measurement the separate contributions of shaft displacement and of housing or shaft distortion and also of shaft vibrations can be sorted out. It is a further object of the invention to provide apparatus for such measurements that will have the least possible effect on the construction of the machine casing, for example the pressure casing of a turbine, and on the flow conditions inside the casing, and preferably the apparatus should be of the type that can be provided on an existing machine.

The fixed structure, such as the pressure casing of a turbine, is provided with a bore running tangentially to the rotor of the machine and rays from an emitting device are projected through the bore so as to graze the rotor surface or even to allow the rotor partially to obstruct the passage of the rays along the bore. A detecting device then detects the intensity of the rays passing through the tangential bore, the intensity being subject to variation by radial deflection of the rotor. The emitting device and the detecting device constitute a means for observing variations in the degree of obstruction of the sight through the bore. Two or more bores tangential at different positions of the rotor, at either the same or different axial positions, are used for obtaining more complete information on the behavior of the rotor, including its shaft. If the machine has a multiple rotor as is commonly the case for turbines, two or more axially distributed tangential bores may be used. A series of tangential bores distributed axially may be radially staggered so as to follow progressively a radial displacement or vibration of the rotor.

In addition to the tangential bores particularly suited for observing radial displacements at different angles of rotation, a bore may be provided in the casing for projecting rays through an axial clearance so as to observe axial displacements and vibrations.

The bores for passing rays through machine clearances in accordance with the present invention are equipped with transparent seals for pressure and thermal insulation and also to provide a corrosion barrier when the rotating machine in question requires it, as in the case of a steam turbine, gas turbine, compressor or the like.

In some configurations of casings with relatively thick walls, it is convenient to equip the tangential bore with mirrors at each end, thus on each side of the clearance to be measured, so that the emitted rays may be introduced into the casing and taken out of the casing for detection at a different angle, usually conveniently at right angles to the tangential path through the clearance. An optical system may be used with the ray emitting device and also with the detecting device. The detecting device may be used to detect the presence, the intensity and the character of the rays reaching it.

In the portion of the system serving to detect axial displacement, it is desirable to project the rays through the axial clearance across a radial surface of the rotor, thus across the edge of the vanes of a turbine or across a disc surface of a rotor. The rays should be passed through the clearance between the rotor and the fixed structure where the largest vibration amplitudes are to be expected. For axial displacement this may be near the ends of the vanes in the case of a turbine. For detecting radial displacements a location at an axial position midway between the bearings is likewise desirable. In the case of relatively great stresses with reference to the vibration pattern, for example in the case of experimental models, it is useful to distribute the measurement positions both axially and circumferentially.

A considerable variety of rays may be used in the practice of the present invention. Coherent light rays, such as are emitted by a laser, or ordinary light rays may be used, as well as other electromagnetic radiant rays, such as X-rays, for example. Rays from a radioactive isotope may also be used. What is necessary is that the rays should be capable of passing down the bore through the clearance gap and impinging on a suitable detector for detection and analysis. Where the ray path includes deflection by mirrors, the radiation must of course be suitable for specular reflection.

When in the course of a measurement the outer portion of a rotor or the outer surface of a shaft dips into the region illuminated by the ray passing through the tangential bore, a corresponding dip in the intensity of the rays is received at the detector. Such a dip at a particular measuring point can be caused by a vibration of the shaft or it could be the result of a movement of the shaft as a body relative to the casing. The provision of a second measuring position at a location of 180° away, that is, on the opposite side of the shaft, shows the same result in the case of a vibration, with a difference of phase. Asymmetric results indicate a relative change in position or a distortion of the rotor or of the fixed structure.

When two measuring positions are separated by 90° of the circumference of the rotor, for example, a measurement of vibrations is possible in which the maximum vibration amplitude, which is given by the formula $s_R = \sqrt{s_1^2 + s_2^2}$, can be continuously checked. It is also possible to provide an oscillographic representation of the displacement of the center of the shaft.

In principle the arrangement of two measuring positions separated by 90° of the circumference of the rotor or shaft is sufficient if the relative position of the rotor is defined with sufficient certainty. In order to have redundance for check purposes, however, or for better resolution of vibrations, distortions of the fixed structure and of the rotor and relative position displacements, it is advantageous to use three or four measuring points spaced at circumferential intervals of 90°. Arrangements with spacing less than 90° are, of course, also possible.

The present invention will now be described by way of example with reference to the accompanying drawings, wherein.

Figure 1:
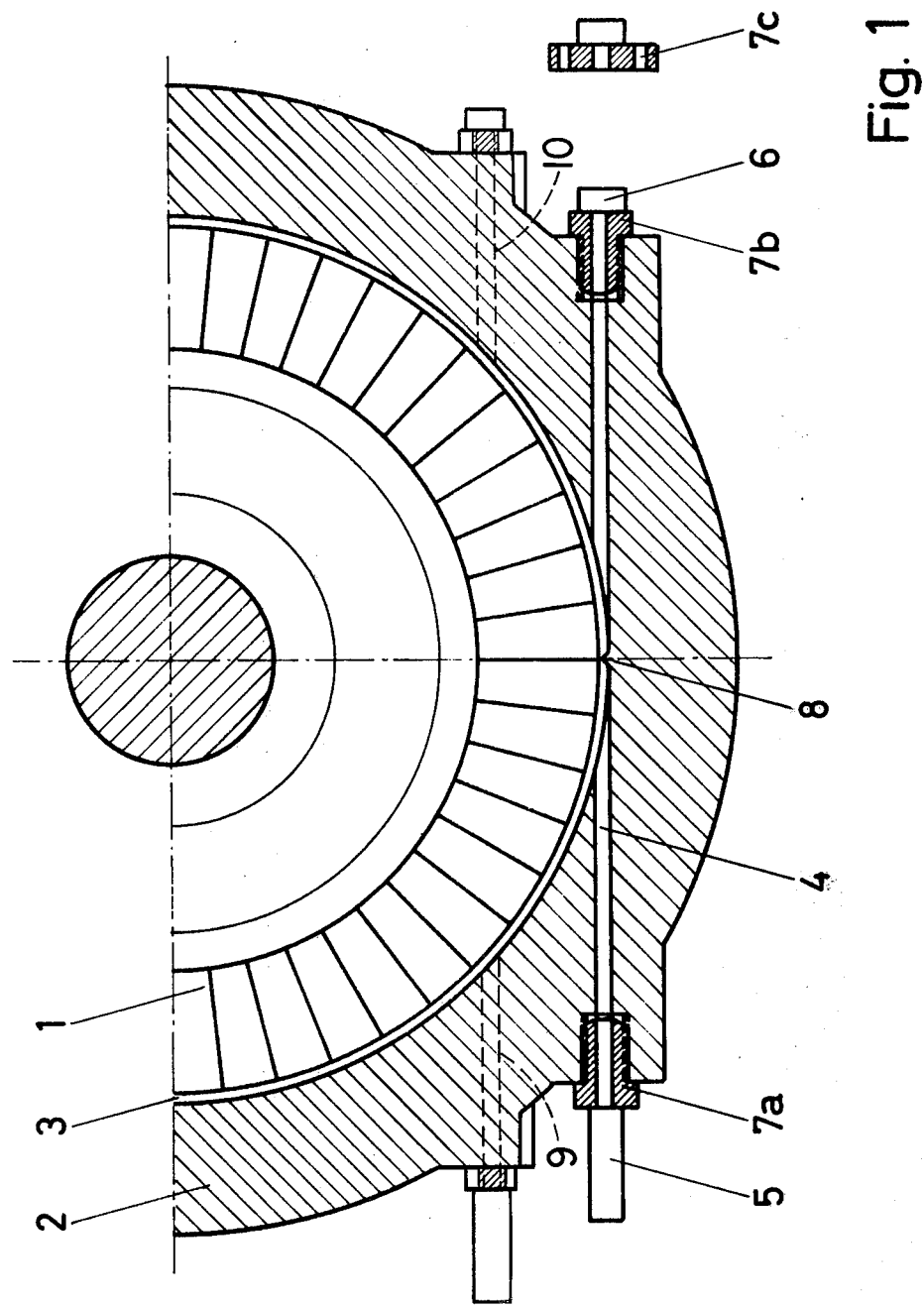
FIG. 1 shows a cross-section of a turbine provided with a tangential ray passage in accordance with the invention.

FIG. 1 shows a turbine cross-section with a tangential ray passage 4. The clearance gap 3 is located between the rotor 1 and the fixed structure or casing 2. The emitter device 5, which is mounted in the housing by means of a screw mount 7a, emits rays that pass along the tangential bore 4 proceeding directly across the clearance gap at the place of measurement, where they may be a restriction 8 to make the measurement of the gap width more sensitive. The emitted rays, changed as they may be by passing the place of measurement, continue to the screw mount 7b at the other end where the detector 6 is mounted. The flange mount 7c is shown in FIG. 1 to illustrate another way of mounting the emitter and detector devices.

The provision of a single radial clearance measurement by the single tangential ray path 4, shown in FIG. 1, is the simplest application of the present invention. The path of the rays is so arranged or adjusted that in normal operation it is not restricted by the rotor body. Since the rays pass very close to the rotor circumference, however, abnormal conditions of operation giving rise to vibrations or displacements of the rotor will cause restriction of the ray path at the measuring point, weakening the ray, and this result may be used to initiate a warning signal or to put protective measures into operation. To obtain data indicating the nature and extent of displacement, which may be referred to as quantified results, it is generally necessary to obtain higher resolution by the use of several points of measurement, each in a different ray path. In addition, as mentioned before, axial clearance between the vanes of rotor 1 and the stator structure of the turbine (not shown) behind the rotor 1 in FIG. 1, may similarly be measured through the bores 9 and 10 which are coaxial and hence in effect continuations of each other.

Figure 2:
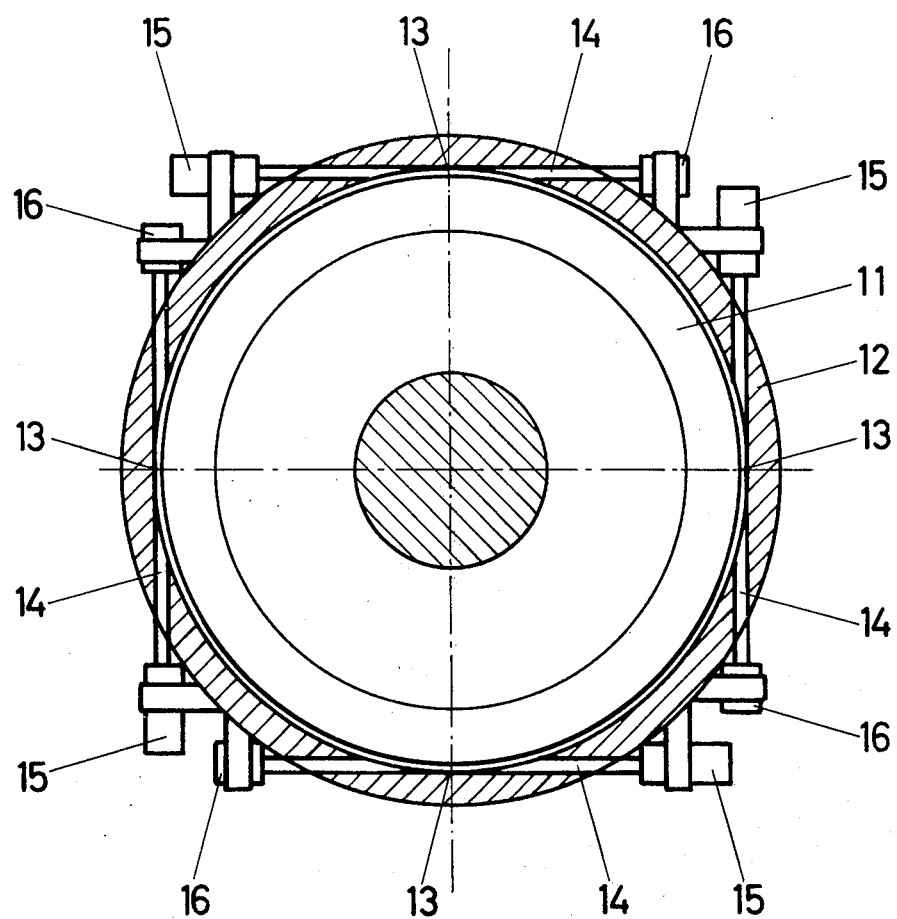
FIG. 2 is a cross-section of a turbine provided with four measuring positions at 90° spacings around the circumference of the rotor.

FIG. 2 shows a turbine cross-section in which there are four measuring positions spaced by 90° around the circumference of the rotor 11 that is separated from the casing 12 by the gap 13. In each case a beam of rays passes through the tangential bore 14 from the emitter 15 to the detector 16, passing through the clearance gap 13 in the middle of that path. Such an arrangement can also be provided with only two measuring positions, one offset from the other by 90°. The angle of the tangential bores (that define the measuring positions) to the vertical and the transverse horizontal axes of the machine can in principle have any value. Instead of being at zero and 90° as shown in FIG. 2, they could be at 45°, for example.

Figure 3:
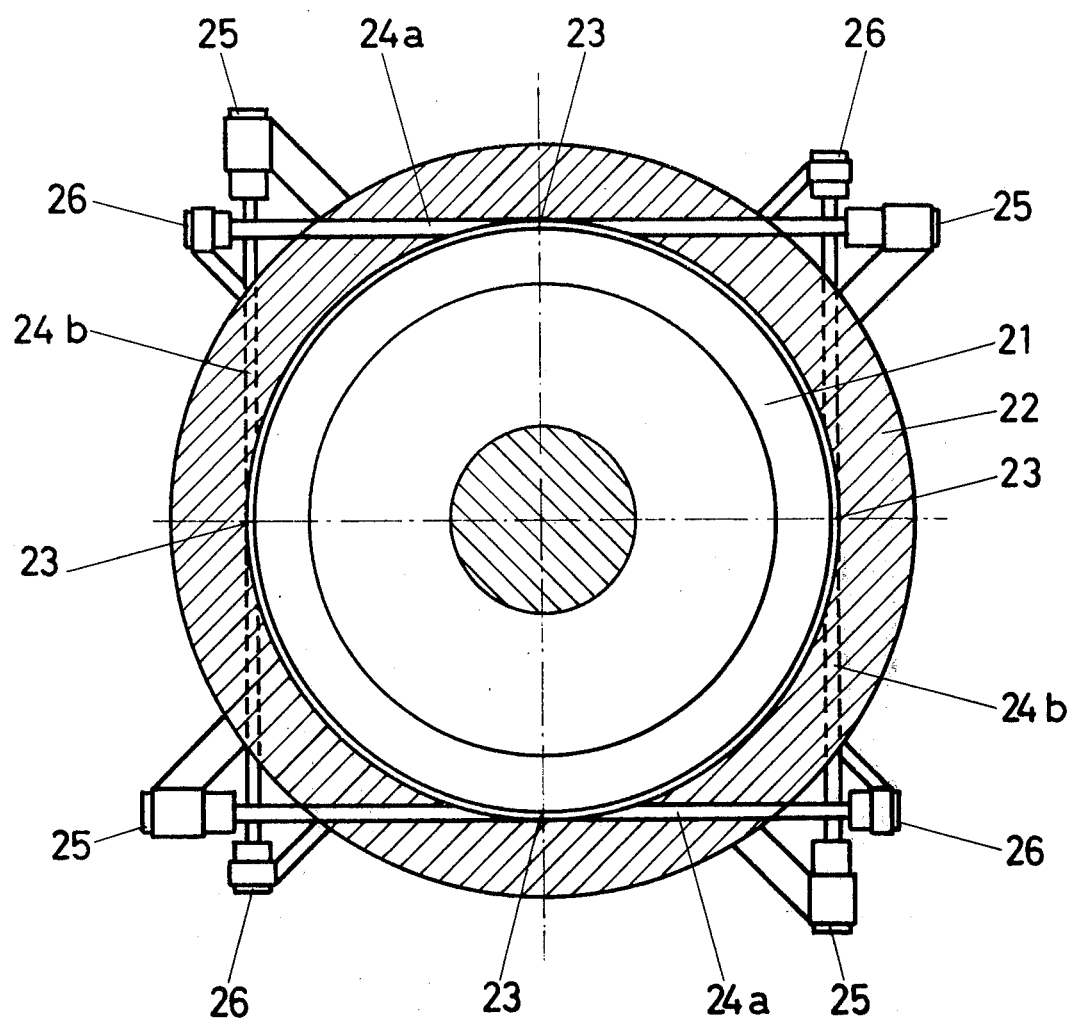
FIG. 3 is a cross-section of a turbine with four measuring positions at 90° displacement from each other in which two are axially displaced.

FIG. 3 shows a turbine cross-section in which the diameter-to-wall thickness ratio of the casing is such that the ends of the tangential bores, in a pattern such as that of FIG. 2, would interfere with each other if the bores are all centered in the same plane perpendicular to the axis, i.e., at the same axial position. In the arrangement of FIG. 3 interference of adjacent measuring equipment is avoided by offsetting two of the bores axially with respect to the other two. In the turbine cross-section shown in FIG. 3 the clearance gap 23 is found between the outer edge of the rotor 21 and the casing 22. The measuring beam of rays from an emitter 25 to a detector 26 passes through either one of the tangential bores 24a centered on the plane of the drawing or through one of the axially offset tangential bores 24b. The arrangement of FIG. 3 avoids problems of the type that could arise if the rays were required to cross. For some types of rays, however, it is possible to have a crossing of the rays, in which case even with relatively thick casing walls four tangential bores intersecting at right angles could be used.

In the arrangement of FIG. 3, again, only two tangential bores associated with measuring positions spaced by 90° of the rotor circumference may provide sufficient information and here again the bores do not need to be horizontal and vertical but they may be slanted, for example at 45° to the horizontal and vertical directions.

Figure 4:
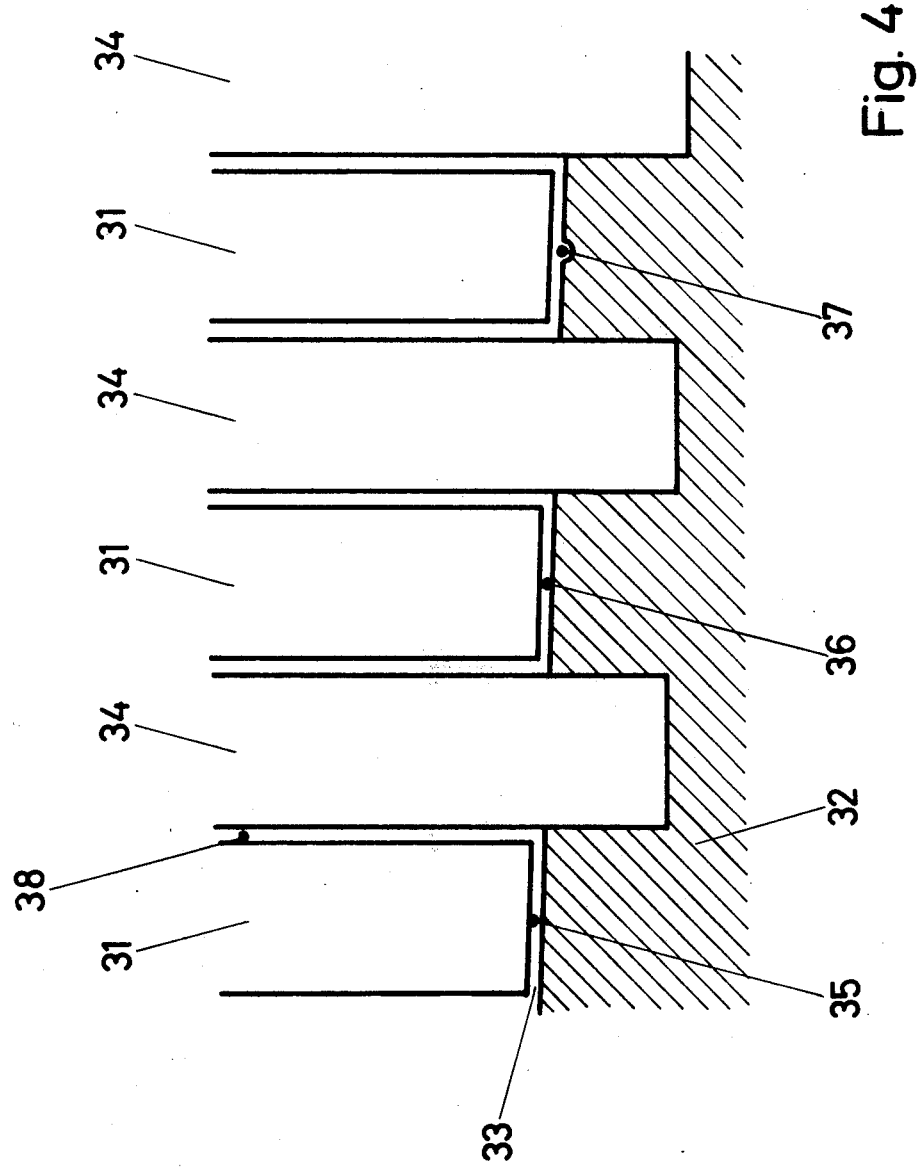
FIG. 4 is a longitudinal section, in schematic form, of a portion of a turbine showing axially displaced measuring positions.

FIG. 4 shows a preferred embodiment of the invention for measuring the clearance. In this case quantization of the measurement is provided by a staggered arrangement of several tangential bores, so that as the rotor is stressed three parallel bores will be progressively obscured by the rotor. Thus a certain threshold condition for the bore nearest to the axis may represent a certain deflection of the shaft, while the same threshold condition for a bore farther from the axis corresponds to a greater deflection of the shaft.

In the arrangement of FIG. 4, because of the difficulties likely to be encountered in generating some kinds of rays in several beams located closely adjacent to each other, the individual measuring positions in the arrangement of FIG. 4 are distributed over the outer edges of several successive sets of turbine vanes. The turbine rotor, here shown diagrammatically and partially in a longitudinal section, has three sets of vanes 31, which cooperate with the three sets of fixed deflector vanes 34 mounted on the casing 32. The clearance gap 33 is found at the outer edge of each of the sets of vanes 31, between these vanes and the casing 32.

As shown in FIG. 4 the beam of rays 35 is partially cut off by the left-hand group of vanes 31. Accordingly, this beam is detected only in weakened condition. Under the conditions of FIG. 4 the beam of rays 36 has free passage through the clearance gap as has also the beam of rays 37, which is further offset radially, with part of the beam passing through a groove in the clearance gap. The groove may be blocked at the measuring position, as at 8 in FIG. 1 (see also FIGS. 8 & 9).

As shown in FIG. 4 each bundle of rays is represented by a single dot, which may be regarded as the cross-section of the bundle of rays. In this particular case the three bores for the rays 35, 36 and 37 are parallel, which is to say that the measuring positions in question are at the same angular position of rotation of the rotor. If now the clearance is reduced, for whatever reason, changes will be detected at the measuring position 36 and then at the measuring position 37 as the clearance is further reduced, while the rays 35, which were already weakened, will be still further weakened and perhaps entirely cut off. On the other hand if the clearance should for some reason increase, more of the rays 35 will be received by the detector associated with those rays. With similar measuring positions spaced by 90° or 180° around the circumference of the rotor there can be provided in addition to the more sensitive detection of the progressive narrowing of the clearance, also a determination of the pattern of clearance changes, so that the various causes or components of these changes can be distinguished and resolved. For complete information it is desirable to detect also changes in axial clearances. The radiation beam 38 of FIG. 4 is provided for making this determination after the manner shown by reference to the bores 9 and 10 of FIG. 1, to measure variations in the clearance between the rotor vanes 31 and the fixed deflector vanes 34.

Indication of the quantized or progressive change of the clearance dimension and of the vibration pattern, distinguishing the respective amplitudes and frequencies, can be carried out, for example, by an oscillographic display or by an indication produced by means of photosensitive semiconductors or other photosensitive elements serving as measuring devices. Analog or digital recording devices may be used to preserve the results obtained by photosensitive detectors responsive to the changes in the various clearances measured in the manner here described in a rotary machine.

A laser beam may be used and, in that case, it may be desirable to broaden the beam somewhat by an optical system that can broaden the beam without persistent divergence, so that the quantity of radiation received by the detector will correspond to the illuminated area of the gap, and hence to the gap clearance. In this way it is possible to provide scale indications that can be calibrated. Further possibilities of calibration result from the comparison of the calculable oscillating clearance aperture from the sucessive dead centering of the vane extremities with the actually observed light passage through the clearance.

With other types of radiation, analogous arrangements are made. Here again, an emitter of rays is used (light source, X-ray tube, transmitter, radioactive isotope dose, etc.) to send rays through the tangential bore which are analyzed on arrival by an appropriate detector (photoelectric semiconductor, scintillation counter, receiver, ionization chamber, etc.).

For reasons of reliability and production capability, there are advantages to be obtained in shortening the tangential bore and providing mirrors at each end so that the rays can be introduced and withdrawn from the casing at right angles to the tangential director (as shown in FIGS. 5–9) or at some other convenient angle. This modification results in substantially shorter bores than the entirely tangential ray channels. A heat and pressure seal element, of quartz or similar material, is desirable in most of the machines to which the invention is applied and this seal element may be adjacent to the reflector that is needed for deflecting the ray. As reflectors, metal mirrors or mirror surfaces provide on less reflecting or non-reflecting materials, or on prisms, particularly silvered prisms, are effective.

A reflector and seal is provided both at the entrance end and the exit end of the tangential bore. The sealing function can, if desired, be performed by the reflector elements, for example a prism sealed in the passage, in which case no supplementary seal structure is needed. As mentioned before, the direction of the ray channel between the emitter and the input mirror and between the exit mirror and the detector does not need to be perpendicular to the tangential direction and may be at some other convenient angle. A favorable direction to use is the radial direction of the rotary machine.

Figure 5:
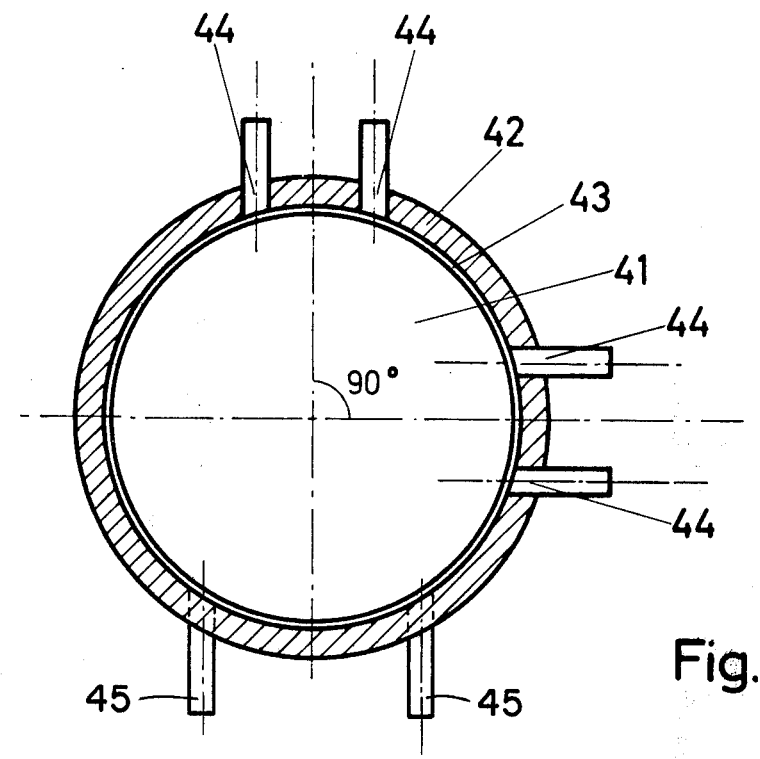
FIGS. 5 and 6 are schematic turbine cross-sections showing input and exit of rays perpendicular to the tangential direction.
Figure 6:
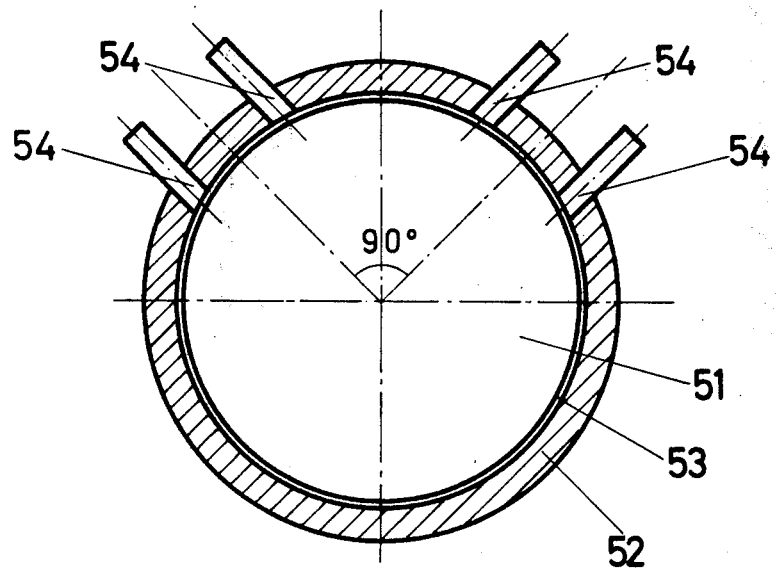
Figure 7:
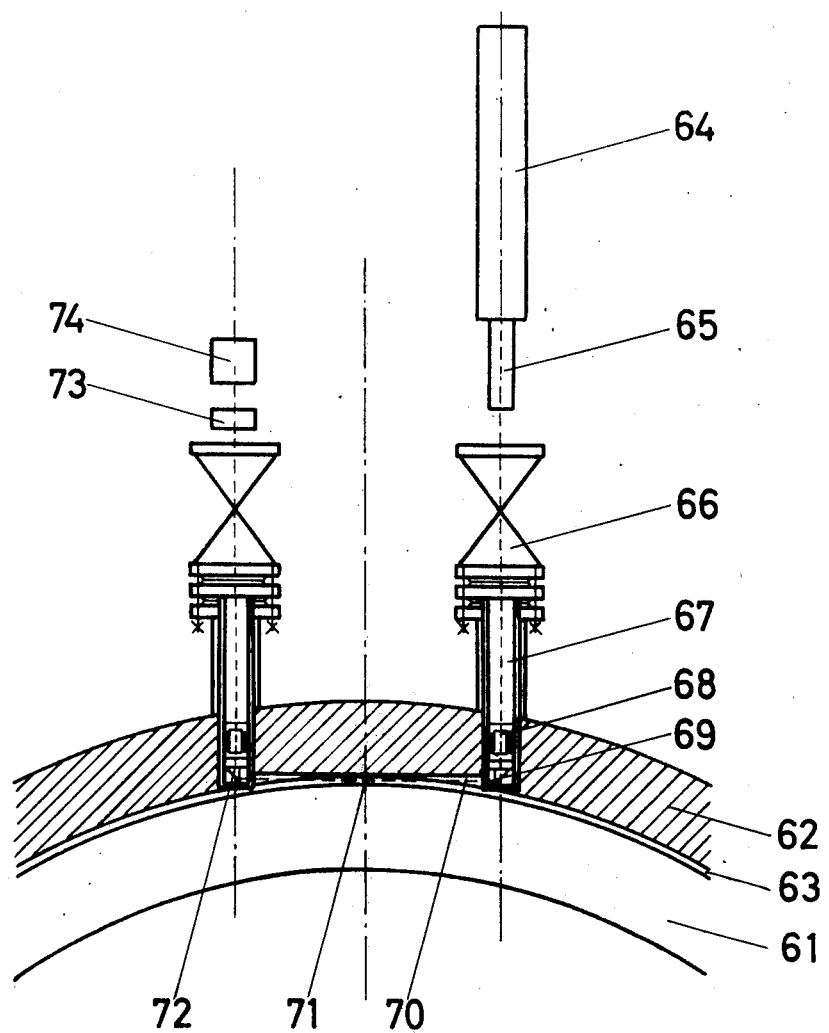
FIG. 7 is a cross-section of a portion of a turbine according to FIG. 5 or FIG. 6.

In the turbine cross-sections shown in FIGS. 5 & 6, the ray entrance channels and the ray exit channels are perpendicular to the tangential direction which the rays follow at the measuring position. In both cases an arrangement with two measuring positions spaced 90° apart is shown. Of course, three or four positions so spaced could be provided. In FIG. 5 the measuring positions are at the ends of vertical and horizontal axes passing through the center of the rotor, whereas in the arrangement of FIG. 6 the measuring positions are displaced by 45° from these axes. FIG. 5 also shows ray entrance and exit channels 45 for measuring an axial clearance, such as is measured at 38 in FIG. 4. In FIG. 5, the rotor 41 and the machine casing 42 are separated by the clearance gap 43. In FIG. 6, the rotor 51 and the machine casing 52 are separated by the clearance gap 53. The beam of rays enters by the channel 44 in FIG. 5 and by the channel 54 in FIG. 6 and is then reflected, by means not shown in these Figures, to proceed tangentially past the measuring position, after which it is again reflected and exits, by the channel 44 in FIG. 5 and the channel 54 in FIG. 6. The structure of a clearance measuring system according to the invention, equipped with mirrors for the purposes just discussed, is shown in more detail in FIG. 7. Here again, the entrance and exit conduits are perpendicular to the tangential direction. The clearance 63 between the rotor 61 and the machine casing 62 is measured in this case. The beam of rays originates from the emitting device 64 which may, for example, be a laser, proceeds through an optical system 65 which serves to give the beam a suitable diameter, and then through a safety port 66 designed to provide protection in case the pressure seal bursts, into the entrance tube 67.

A flange mount allows the position of the entrance tube 67 to be adjusted. Just above the reflector 69, a pressure seal 68 with a transparent central portion is located in the entrance tube 67. The reflector 69 directs the light beam along the tangential groove 70, past the measuring position 71, to a second reflector 72 by which the beam is reflected upward out of the machine through a seal, tube and safety port similar to those used on the entrance side. Before arriving at the detector 74, it passes through a diaphragm 73.

The use of a laser as a source of rays for monitoring or measuring the gap width has particular advantages related to the fact that the laser output is a thin bundle of coherent light rays. Such a light beam is particularly effective for monitoring clearances of the order of one or a few millimeters. If the laser does not supply a beam wide enough to provide illumination all of the way across the gap under measurement, a suitable broadening of the beam can be provided by an optical system. The diameter of this broadened beam should be somewhat greater than the maximum width of the gap under operating conditions. The cylindrical beam will be trimmed down at the measuring position, both by the previously mentioned projection or ridge (8 in FIG. 1) provided to prevent the bore from widening the clearance, and by the outer edges of the turbine vanes, which together define the minimum clearance between the rotor and the machine casing. In order to eliminate entirely from the measurement the factor of the beam cross-sectional area, the edges of the beam not trimmed by the projection 8 and the outer edge of the rotor (vanes) is trimmed by one or more diaphragms. Variations of the gap width, whether vibratory or otherwise, result in variations in light intensity proportional to the cross-sectional area through which light passes at the measuring position, provided that the intensity distribution of the beam is uniform over the illuminated area at the measuring position. A diaphragm 73 (FIG. 7) on a socalled seismic mounting can be provided to define one edge of the illuminated profile of the gap at the measuring position, so that the variations in detected light intensity will then correspond to the absolute shaft vibration or the absolute casing vibration, rather than the relative movement of the rotor edge and the casing wall at the measuring position.

The smaller the remaining rectangular aperture is in relation to the original circular cross-section of the beam, the less sensitive the measurement is to disturbance from vibration of the laser or other light source and other vibrations independent of those to be observed.

Figure 8:
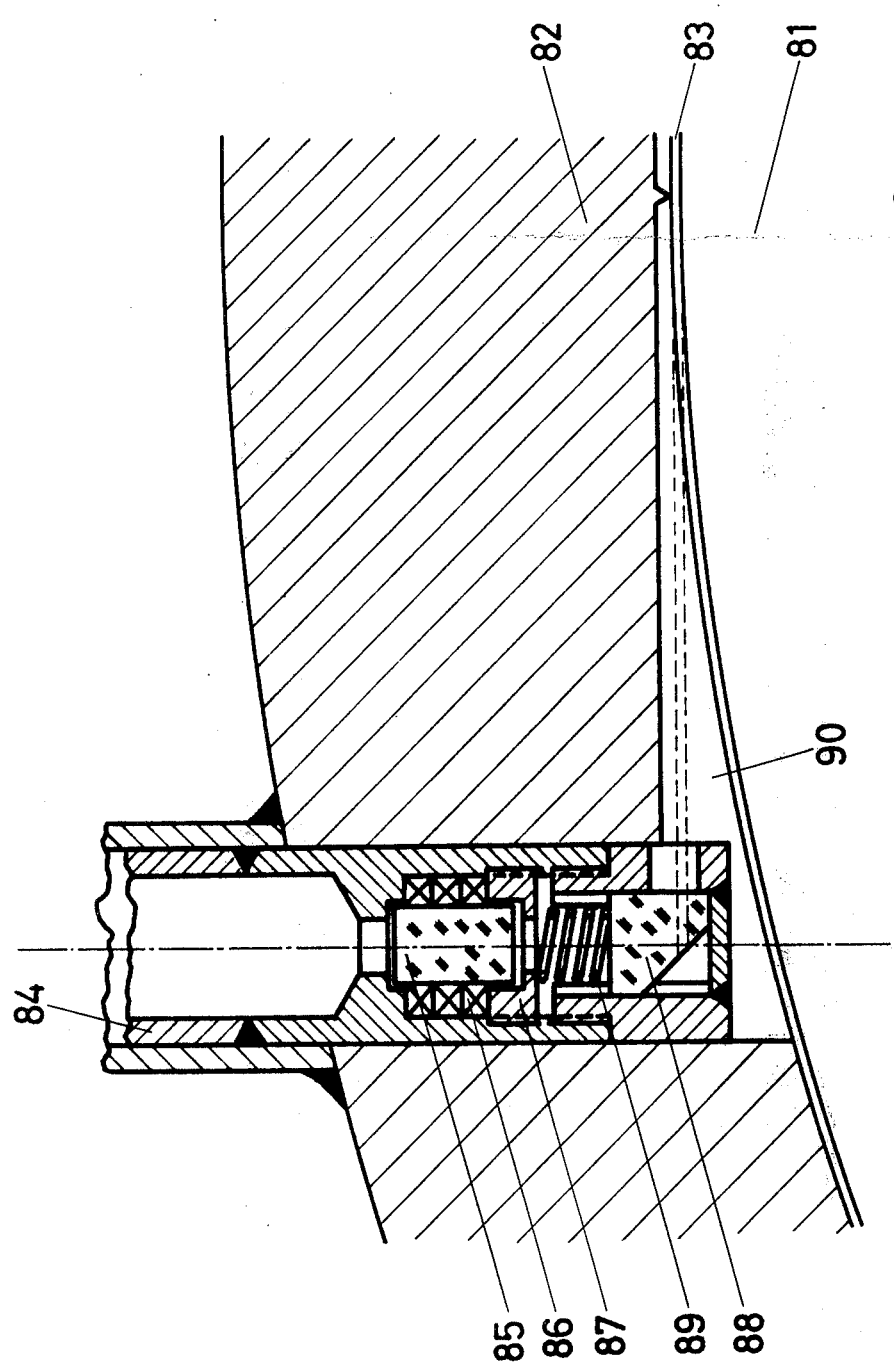
FIG. 8 shows, in cross-section, a detail of a preferred form of construction for an installation of the type of FIG. 5 or FIG. 6.

FIG. 8 shows in still further detail a preferred form of construction of reflector and seal for an embodiment of the invention represented by FIG. 5 or FIG. 6. The clearance gap 83, which is to be measured, is defined by the outer edge of the rotor 81 and the inner surface of the machine casing 82. The entrance or exit tube 84 contains a pressure and heat resistant quartz light duct 85, secured in a seal packing 86, which may, if desired, be provided with heating means to avoid excessive temperature variations. A retaining ring 87 holds and packs the seal 86. The reflector 88, shown as a silvered prism, is held in position by the spring 89 and is arranged to project or receive a tangential measuring beam in the groove 90. In this case, the adjustment of the direction of the beam is accomplished by adjustment of the orientation of the light source.

Figure 9:
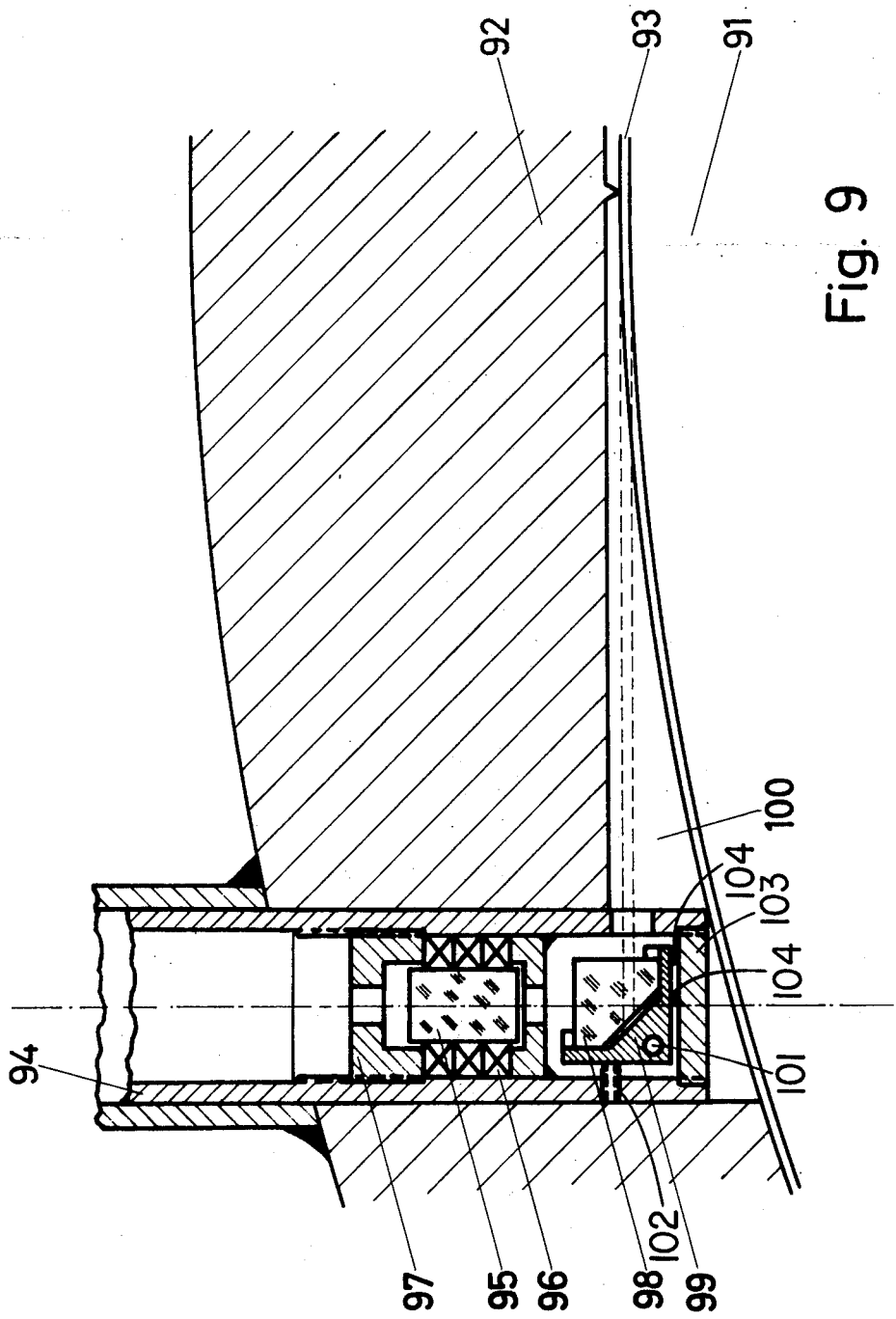
FIG. 9 shows another form for an installation of the type of FIG. 5 or FIG. 6.

FIG. 9 shows another form of reflector and seal assembly. In this case, the reflector 98 is mounted in an adjustable holder 99 that, when the tube 94 is withdrawn, the holder 99 can be rocked slightly about a pivot 101 by a set screw 102 operating against a spring 104 between the tube cap 103 and the holder 99. The gap 93 to be measured is defined by the machine casing 92 and the rotor 91. The entrance or exit tube for the light beam is indicated at 94. There is again a pressure and heat resistant quartz duct element 95, in a seal 96, held in place by a retaining ring 97. The seal may in this case also be provided with heating means (not shown). The groove 100 provides for a tangential path for the light beam for measuring the clearance 93 at the place of tangency of the light beam.

Both in the design of new machinery equipped with the apparatus of this invention for monitoring the clearance, and in the equipping of existing machinery with the necessary bores, seals, emitters and detectors for the practice of the invention, the problem of design and construction is complicated by the physical requirements of cut-outs, peripheral conduits, measuring sensors and measuring transmitters, flange thickness and flange screws. In the case of machines with a horizontal axis of rotation, a measuring position on the vertical axis of the cross-section basically has the advantage of providing direct measurment of the shaft or rotor sag between its bearings, for example as it may depend upon temperature conditions and as it may be observed at rest.

The bore in which the light beam passes can, for example, be considerably wider than the beam diameter, because the beam is so thin, that the bore can be much wider and still be of such dimensions as to create no stability or strength problems in the turbine casing. As explained in connection with FIGS. 2 and 3, the individual bores can be arranged for measurement of the clearance of the same vane or rotor circumference, or else some of them may be offset axially, as may be required by the ratio of casing wall thickness to casing diameter.

The pressure and heat seal for the measuring bore described above may be superfluorus in the case of machines provided with a double casing if the vapor leakage from the inner casing can be neglected in the particular construction. The transparent part of the seal is preferably of quartz ($SiO_2$) or of a special glass designed for such purposes, but other materials are also available for this service. Various kinds of pressure resistant mountings may be used, such as plug-type packings, tube end pressfittings, cemented inserts or the like.

In order to avoid condensation from taking place on the radiation conducting materials and to permit measurements to be carried out at the start of operations when the machine is cold, as well as when it is warm and running, it is preferable to provide for heating the light conducting plugs in the pressure seals, as already mentioned in connection with FIGS. 8 and 9. For this purpose, resistance heating or microwave heating may be used.

Glass fiber light conductors may also be used. With these, the path of the light beam may be deflected without the use of mirrors.

If the conditions of operation require it, the deposit of particles at the entrance and exits to and from the machine casing can be prevented or mitigated by the use of a sealing medium, such as air or other gas, or, in the case of steam turbines, steam from a previous stage. Provision can also be made for draining water from the channels provided for the light beam. If necessary, cooling may be applied to the external emitters and detectors.

In summary, the advantages obtained by the practice of this invention are as follows. By means of the invention the clearance between a machine rotor or shaft and the immediately adjacent casing can be directly measured with high accuracy inside the casing, at rest or during operation, and the measurement can be carried out at the most critical points. The heretofore conventional measurement of vibration at the more readily accessible portions of a machine sought to determine the amount of clearance indirectly by analysis of the shaft vibration thus determined. With the direct measurement of clearances, not only is the most vital information directly obtained, but the variation of the clearance caused by disturbances can be differentiated according to causes, such as displacement, distortion and vibration, as the result of which the safety of continued operation can be more reliably determined. Even in the case of damage by grazing engagement of the rotor with the fixed structure, measurement by the apparatus of this invention enables the extent of the damage to be determined. Exact, absolute and relative vibration measurement of any desired axial position leads the way to broadened knowledge of machine behavior, both by experimental models and by observation of machines in normal use. Knowledge thus developed can lead to the improvement of the design and construction of rotary machines of various kinds.

I claim:

1. In a rotary machine having a rotor arranged for rotation in a fixed structure with a small radial clearance therefrom, an apparatus for detecting radial distortion, deviation or vibration of said rotor or said fixed structure comprising:
a bore (4) in said fixed structure (2) directed tangentially to said rotor (1) and communicating with the clearance space between said rotor and said fixed structure, so that the sight through said bore is partially obstructed by said rotor at least for some amount of distortion or deviation of said rotor or of said fixed structure; and
means (5, 6) for observing variations in the degree of obstruction (8) of the sight of said bore.

2. An apparatus as defined in claim 1 for detecting distortion, deviation or vibration in a rotary machine in which said observing means includes emitter means (5) for emitting rays of radiant energy in a direction tangential to said rotor (1) through said bore (4) and said clearance (8), and detector means (6) responsive to the intensity of the rays passing through said bore and said clearance.

3. An apparatus as defined in claim 1 for measuring distortion, deviation or vibration in a rotary machine in which said bore (4) is provided at each end with reflectors (59, 72) and said observing means includes emitter means (64) for illuminating one (69) of said reflectors with a beam of electromagnetic radiation rays of wavelength shorter than a millimeter and detector means (74) illuminated by the other (72) of said reflectors and responsive to the rays from said emitter (64) passing through said bore (4).

4. An apparatus as defined in claim 1 for detecting distortion, deviation or vibration in a rotary machine in which said observing means includes means for emitting (64) rays of radiant energy and projecting said rays through said bore (4);
means for detecting (74) the said rays which have passed through said bore, and
first and second sealing means for sealing off at least the lengthwise central portion of said bore from the outside of said machine and having a portion transparent to said rays located in the path of said rays through said sealing means, said first sealing means being located between said central portion of said bore and said emitting means and said second sealing means being located between said central portion of said bore and said detecting means.

5. An apparatus as defined in claim 4 in which said transparent portion of said seal is provided with heating means.

6. An apparatus as defined in claim 3 in which said reflector means are adjustable for accurately directing rays from said emitter means through said bore and thence to said detector means.

7. An apparatus as defined in claim 1 in which a plurality of bores (4) tangential to said rotor (1) are provided, each with its observing means, and in which two of said bores are substantially at the same axial position but displaced 90 degrees circumferentially of said rotor.

8. An apparatus as defined in claim 1 in which said rotor also has a small axial clearance from said fixed structure and in which additional bores (38) are provided communicating with said axial clearance respectively for illuminating said axial clearance and for receiving illumination through said clearance and additional observing means are provided for illuminating an axial clearance and detecting illumination effected therethrough for observing axial distortion, deviation or vibration, said apparatus also having a plurality of bores tangential to said rotor, each with a separate observing means, for detection of radial distortion, deviation or vibration.

9. An apparatus as defined in claim 1 in which a plurality of bores tangential to said rotor are provided, each with its observing means and in which at least some of said bores are relatively axially displaced.

10. An apparatus as defined in claim 9 in which said bores are relatively displaced both radially and axially, said radial displacement being arranged for progressive detection of radial displacement of said rotor.

11. A method of observing distortion and vibration in a rotary machine affecting clearance between the periphery of a rotor of said machine and an adjacent fixed structure of said machine which comprises simultaneously projecting, while said machine is running, beams of radiant energy rays tangentially of said rotor through said clearance respectively at axially spaced locations and respectively centered at incrementally different radial distances from the central axis of said rotor, simultaneously detecting the intensity of said radiant energy rays of each of said beams passing through said clearance and causing visible traces of the time course of said respective detected intensities to be displayed.

12. A method of measuring distortion and vibration in a rotary machine affecting clearance between a rotor of said machine and a closely adjacent fixed structure of said machine which comprises simultaneously projecting, while said machine is running and interacting with a medium under pressure at least in said clearance, a plurality of beams of radiant energy rays through transparent entry and exit seals into and out of said machine and through said clearance at respectively different locations of said clearance, including a plurality of radial clearance locations spaced apart circumferentially of said rotor through which said respective beams are projected tangentially of said rotor and at least one axial clearance location through which one of said beams is projected along a path parallel to a chord of a radial cross-section of said rotor, simultaneously detecting the intensity of said radiant energy rays of each of said beams passing through the respective clearance locations and causing visible traces of the time course of said respective detected intensities to be displayed.

13. A method of measuring distortion and vibration in a rotary machine having a rotor, equipped with a multiplicity of uniformly spaced, radially projecting members extending to the same radial distance, arranged to move with a small clearance between the ends of said members and a fixed structure which comprises projecting, while said machine is running, a beam of radiant energy rays tangentially of said rotor through said clearance, detecting the intensity of said radiant energy rays of said beam passing through said clearance, detecting the amplitude of oscillations of said intensity produced by dead centering of the vane extremities of said projecting member in said beam, and observing the ratio of said detected intensity to said detected oscillation amplitude as a measure of said clearance where said beam is projected through said clearance.

* * * * *